US009715665B2

(12) United States Patent
Schondorf et al.

(10) Patent No.: US 9,715,665 B2
(45) Date of Patent: Jul. 25, 2017

(54) METHODS AND SYSTEMS FOR MONITORING THE CONDITION OF VEHICLE COMPONENTS FROM A NOMADIC WIRELESS DEVICE OR COMPUTER

(75) Inventors: Steven Yellin Schondorf, Dearborn, MI (US); Robert Bruce Kleve, Farmington, MI (US); John Robert Van Wiemeersch, Novi, MI (US); Dilip B. Patel, Novi, MI (US); Brian Bennie, Sterling Heights, MI (US); Gregory Swadling, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2140 days.

(21) Appl. No.: 12/563,548

(22) Filed: Sep. 21, 2009

(65) Prior Publication Data

US 2011/0071720 A1    Mar. 24, 2011

(51) Int. Cl.
*G06Q 10/06* (2012.01)
*G07C 5/00* (2006.01)
(Continued)

(52) U.S. Cl.
CPC ............ *G06Q 10/06* (2013.01); *G07C 5/008* (2013.01); *G07C 5/0808* (2013.01); *H04L 67/12* (2013.01); *H04W 4/04* (2013.01)

(58) Field of Classification Search
USPC .... 701/30, 400, 29.1, 29.4, 29.6, 31.4, 31.5, 701/31.6, 32.3, 32.4, 33.2, 34.2
See application file for complete search history.

(56) References Cited

U.S. PATENT DOCUMENTS 4,797,671 A    1/1989  Toal, Jr.
4,804,937 A    2/1989  Barbiaux et al.
(Continued)

FOREIGN PATENT DOCUMENTS

DE    10141439          2/2003
DE    10225787 A1    12/2003
(Continued)

OTHER PUBLICATIONS

Acumine Fleet Monitoring System, printout from www.acumine.com.

(Continued)

*Primary Examiner* — Nicholas Kiswanto
(74) *Attorney, Agent, or Firm* — Jennifer Stec; Brooks Kushman P.C.

(57) ABSTRACT

A computer-implemented method for detecting a working condition of one or more vehicle components includes communicating with a cellular communication module in a vehicle over a telecommunications network. A vehicle component characteristic or identifier for the vehicle components is received over the telecommunication network. One or more operation status identifiers for the one or more vehicle components based on data from the vehicle is also received. A location for servicing or purchasing the one or more vehicle components based on the vehicle component characteristic or identifier is determined. A service status of the one or more vehicle components based on the one or more operation status identifiers is also determined. Based on the service status, a message including an identification of the vehicle components and a service or purchase location for the vehicle components is generated. The message is transmitted to a terminal for display.

11 Claims, 6 Drawing Sheets

(51) Int. Cl.
*G07C 5/08* (2006.01)
*H04W 4/04* (2009.01)
*H04L 29/08* (2006.01)

(56) References Cited

U.S. PATENT DOCUMENTS

| | | | |
|---|---|---|---|
| 5,355,511 A | 10/1994 | Hatano et al. | |
| 5,432,841 A | 7/1995 | Rimer | |
| 5,633,484 A | 5/1997 | Zancho et al. | |
| 5,654,686 A | 8/1997 | Geschke et al. | |
| 5,732,074 A * | 3/1998 | Spaur et al. | 370/313 |
| 5,758,300 A * | 5/1998 | Abe | 455/424 |
| 5,889,468 A | 3/1999 | Banga | |
| 5,942,979 A | 8/1999 | Luppino | |
| 5,943,206 A | 8/1999 | Crayford | |
| 5,963,129 A | 10/1999 | Warner | |
| 5,986,543 A * | 11/1999 | Johnson | 340/426.19 |
| 5,993,397 A | 11/1999 | Branson | |
| 6,025,777 A | 2/2000 | Fuller et al. | |
| 6,037,676 A | 3/2000 | Foree | |
| 6,067,009 A * | 5/2000 | Hozuka et al. | 340/459 |
| 6,104,931 A | 8/2000 | Havinis et al. | |
| 6,292,095 B1 | 9/2001 | Fuller et al. | |
| 6,295,449 B1 * | 9/2001 | Westerlage et al. | 455/422.1 |
| 6,339,736 B1 * | 1/2002 | Moskowitz | G06Q 10/087 |
| | | | 340/988 |
| 6,343,220 B1 * | 1/2002 | Van Der Salm | 455/552.1 |
| 6,370,472 B1 * | 4/2002 | Fosseen | 701/102 |
| 6,377,890 B1 | 4/2002 | Doi | |
| 6,415,210 B2 * | 7/2002 | Hozuka et al. | 701/31.4 |
| 6,429,773 B1 | 8/2002 | Schuyler | |
| 6,435,018 B1 * | 8/2002 | Murakami et al. | 73/114.01 |
| 6,438,471 B1 * | 8/2002 | Katagishi | G07C 5/008 |
| | | | 701/31.4 |
| 6,441,732 B1 | 8/2002 | Laitsaari et al. | |
| 6,470,732 B1 * | 10/2002 | Breton | 73/23.31 |
| 6,487,478 B1 * | 11/2002 | Azzaro et al. | 701/24 |
| 6,525,643 B1 | 2/2003 | Okada et al. | |
| 6,571,617 B2 | 6/2003 | Van Nierkerk et al. | |
| 6,587,040 B2 | 7/2003 | Seto | |
| 6,611,740 B2 * | 8/2003 | Lowrey et al. | 701/29.4 |
| 6,612,165 B2 | 9/2003 | Juzswik et al. | |
| 6,629,031 B2 | 9/2003 | Gustavsson et al. | |
| 6,671,609 B2 | 12/2003 | Nantz et al. | |
| 6,691,025 B2 * | 2/2004 | Reimer | 701/123 |
| 6,732,028 B2 * | 5/2004 | Vanstory | G06Q 10/20 |
| | | | 701/32.6 |
| 6,732,031 B1 * | 5/2004 | Lowrey et al. | 701/31.4 |
| 6,738,697 B2 | 5/2004 | Breed | |
| 6,825,758 B1 | 11/2004 | Laitsaari | |
| 6,832,708 B2 | 12/2004 | Tripathi | |
| 6,839,614 B1 * | 1/2005 | Timko et al. | 701/1 |
| 6,845,314 B2 * | 1/2005 | Fosseen | 701/114 |
| 6,847,872 B2 * | 1/2005 | Bodin et al. | 701/31.4 |
| 6,853,853 B1 | 2/2005 | Van Wiemeersch et al. | |
| 6,868,358 B2 | 3/2005 | Brown | |
| 6,892,052 B2 | 5/2005 | Kotola et al. | |
| 6,892,936 B2 * | 5/2005 | Riggert | G06Q 10/06 |
| | | | 235/375 |
| 6,920,382 B2 * | 7/2005 | Katagishi | G07C 5/008 |
| | | | 701/31.5 |
| 6,930,614 B2 | 8/2005 | Rackham et al. | |
| 6,937,141 B2 | 8/2005 | Muramatsu | |
| 6,983,200 B2 * | 1/2006 | Bodin et al. | 701/32.4 |
| 6,993,421 B2 * | 1/2006 | Pillar et al. | 701/29.4 |
| 7,040,154 B2 | 5/2006 | Shaw et al. | |
| 7,053,761 B2 | 5/2006 | Schofield et al. | |
| 7,068,158 B2 | 6/2006 | Komatsu et al. | |
| 7,092,804 B2 | 8/2006 | McQuade et al. | |
| 7,096,101 B2 | 8/2006 | Sonnenrein et al. | |
| 7,103,460 B1 * | 9/2006 | Breed | 701/32.9 |
| 7,114,379 B2 * | 10/2006 | Emord | 73/114.52 |
| 7,170,400 B2 | 1/2007 | Cowelchuk et al. | |
| 7,171,188 B1 * | 1/2007 | Watanabe et al. | 455/404.1 |
| 7,216,532 B2 | 5/2007 | Rimkus et al. | |
| 7,218,209 B2 | 5/2007 | Utter et al. | |
| 7,219,063 B2 | 5/2007 | Schalk et al. | |
| 7,224,262 B2 | 5/2007 | Simon et al. | |
| 7,228,122 B2 | 6/2007 | Oyagi et al. | |
| 7,319,378 B1 | 1/2008 | Thompson et al. | |
| 7,379,541 B2 | 5/2008 | Iggulden et al. | |
| 7,394,352 B2 | 7/2008 | Bell et al. | |
| 7,509,849 B2 | 3/2009 | Rutherford et al. | |
| 7,778,186 B2 | 8/2010 | Oman et al. | |
| 7,783,246 B2 | 8/2010 | Twitchell, Jr. et al. | |
| 7,849,149 B2 * | 12/2010 | Habaguchi et al. | 709/207 |
| 7,859,392 B2 | 12/2010 | McClellan et al. | |
| 8,061,879 B2 | 11/2011 | Simmons et al. | |
| 8,089,348 B2 | 1/2012 | Kameyama | |
| 8,120,475 B2 | 2/2012 | Iwamoto et al. | |
| 8,325,028 B2 | 12/2012 | Schofield et al. | |
| 8,370,020 B2 * | 2/2013 | Bauman | G07C 5/008 |
| | | | 340/426.15 |
| 2001/0033225 A1 * | 10/2001 | Razavi et al. | 340/425.5 |
| 2002/0130771 A1 | 9/2002 | Osborne et al. | |
| 2003/0004741 A1 | 1/2003 | Johnson et al. | |
| 2003/0016130 A1 | 1/2003 | Joao | |
| 2003/0093218 A1 | 5/2003 | Jones | |
| 2003/0158640 A1 | 8/2003 | Pillar | |
| 2003/0205081 A1 | 11/2003 | Proschka | |
| 2003/0208309 A1 | 11/2003 | Triphathi | |
| 2004/0050188 A1 * | 3/2004 | Richards et al. | 73/866.3 |
| 2004/0075539 A1 | 4/2004 | Savoie et al. | |
| 2004/0112124 A1 | 6/2004 | Sonnenrein et al. | |
| 2004/0192189 A1 * | 9/2004 | Yuhara | H04B 7/18523 |
| | | | 455/3.02 |
| 2004/0193368 A1 | 9/2004 | Sanqunetti | |
| 2004/0203634 A1 | 10/2004 | Wang et al. | |
| 2005/0015299 A1 * | 1/2005 | Sisserian | G06Q 30/02 |
| | | | 705/14.38 |
| 2005/0024189 A1 | 2/2005 | Weber | |
| 2005/0137763 A1 | 6/2005 | Watkins et al. | |
| 2005/0179518 A1 | 8/2005 | Kawamura et al. | |
| 2005/0190900 A1 | 9/2005 | White et al. | |
| 2005/0195106 A1 | 9/2005 | Davis et al. | |
| 2005/0273218 A1 * | 12/2005 | Breed et al. | 701/2 |
| 2006/0095174 A1 | 5/2006 | Sonnenrein et al. | |
| 2006/0208865 A1 | 9/2006 | Quach et al. | |
| 2006/0220806 A1 | 10/2006 | Nguyen | |
| 2006/0220809 A1 | 10/2006 | Stigall et al. | |
| 2006/0220813 A1 | 10/2006 | Utter et al. | |
| 2006/0235652 A1 | 10/2006 | Rimkus et al. | |
| 2006/0273885 A1 | 12/2006 | Thompson | |
| 2006/0288101 A1 | 12/2006 | Mastrodonato et al. | |
| 2007/0015548 A1 | 1/2007 | Flick | |
| 2007/0027595 A1 | 2/2007 | Nou | |
| 2007/0060056 A1 | 3/2007 | Whitaker et al. | |
| 2007/0069951 A1 | 3/2007 | Sweet | |
| 2007/0155300 A1 | 7/2007 | Hsieh | |
| 2007/0156317 A1 | 7/2007 | Breed | |
| 2007/0193348 A1 | 8/2007 | Rutherford et al. | |
| 2007/0200671 A1 | 8/2007 | Kelley et al. | |
| 2007/0229350 A1 | 10/2007 | Scalisi et al. | |
| 2007/0290881 A1 | 12/2007 | Nikitin et al. | |
| 2008/0024285 A1 | 1/2008 | Vandenbrink et al. | |
| 2008/0046149 A1 | 2/2008 | Breed | |
| 2008/0077292 A1 | 3/2008 | Gisler | |
| 2008/0082221 A1 * | 4/2008 | Nagy | G07C 5/0808 |
| | | | 701/2 |
| 2008/0106859 A1 | 5/2008 | Eguchi et al. | |
| 2008/0125665 A1 | 5/2008 | Nigam | |
| 2008/0136611 A1 | 6/2008 | Benco et al. | |
| 2008/0140265 A1 | 6/2008 | Hong et al. | |
| 2008/0147265 A1 | 6/2008 | Breed | |
| 2008/0147271 A1 | 6/2008 | Breed | |
| 2008/0172147 A1 | 7/2008 | Taki et al. | |
| 2008/0197970 A1 | 8/2008 | Fouts | |
| 2008/0204556 A1 | 8/2008 | de Miranda | |
| 2008/0215665 A1 | 9/2008 | Appleby et al. | |
| 2008/0228355 A1 | 9/2008 | de Jonk et al. | |
| 2008/0266051 A1 | 10/2008 | Taki et al. | |
| 2008/0299961 A1 | 12/2008 | Muller et al. | |
| 2008/0309451 A1 | 12/2008 | Zellweger et al. | |
| 2009/0075624 A1 | 3/2009 | Cox et al. | |

(56) References Cited

U.S. PATENT DOCUMENTS

| | | |
|---|---|---|
| 2009/0091437 A1 | 4/2009 | Corniot |
| 2009/0096575 A1 | 4/2009 | Tieman |
| 2009/0096576 A1 | 4/2009 | Oman et al. |
| 2009/0096596 A1 | 4/2009 | Sultan et al. |
| 2009/0098907 A1 | 4/2009 | Huntzicker et al. |
| 2009/0167524 A1 | 7/2009 | Chesnutt et al. |
| 2009/0273438 A1 | 11/2009 | Sultan et al. |
| 2010/0145759 A1 | 6/2010 | Hembury |
| 2010/0168967 A1 | 7/2010 | Dlugoss et al. |
| 2010/0233957 A1 | 9/2010 | Dobosz |
| 2011/0015971 A1 | 1/2011 | Hembury |
| 2011/0029875 A1 | 2/2011 | Milch |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0080282 A1 | 4/2011 | Kleve et al. |
| 2011/0130945 A1 | 6/2011 | Deedy et al. |
| 2011/0205040 A1 | 8/2011 | Van Wiemeersch |
| 2011/0205047 A1 | 8/2011 | Patel et al. |
| 2011/0215901 A1 | 9/2011 | Van Wiemeersch et al. |
| 2011/0230165 A1 | 9/2011 | Kleve et al. |

FOREIGN PATENT DOCUMENTS

| | | |
|---|---|---|
| JP | 2005220635 | 8/2005 |
| WO | 2006075533 | 7/2006 |

OTHER PUBLICATIONS

Guard Magic, printout from www.guardmagic.com.
911 Assist, Vehicle Health Report Expand Sync Capabilities and Convenience Features, printout from www.media.ford.com.
Vehicle Health Report Delivers Assistance With Vehicle Maintenance and Monitoring, printout from www.media.ford.com.
Solindo GPS, Solindo Web Products: The Solutions Provider Company. Printout from www.solindoweb.com/products.php on Sep. 16, 2009, pp. 1-4.
J. Smith, Wanted: One Gorilla, printed from www.tirereview.com, Jul. 27, 2009.
Check Tire Pressure with Bluetooth, printed from www.esato.com, Jul. 30, 2004.
Acumine Pty Ltd—Fleet Monitoring System, http://www.acumine.com/_Products/Fleet Monitoring.php., May 22, 2009.
Vehicle monitoring system, GPS vehicle monitoring system. Vehicle tracking system. http://www.guardmagic.com/, May 22, 2009.
Chinese Office Action, FMC 2913 PUS1 Family, Dated Mar. 4, 2013.
German Office Action, FMC 2913 PUS1 Family, Dated Mar. 1, 2013.

* cited by examiner

METHODS AND SYSTEMS FOR MONITORING THE CONDITION OF VEHICLE COMPONENTS FROM A NOMADIC WIRELESS DEVICE OR COMPUTER

BACKGROUND

1. Technical Field

One or more embodiments include a method and system for remotely monitoring a condition of vehicle components or systems. One or more vehicle components or systems may be monitored from a nomadic wireless device or computer.

2. Background Art

Mechanical and electrical problems with a vehicle can arise at any time, but the vehicle may manifest only a few symptoms. For example, a squeak, a rattle, or a "knocking" noise coming from the vehicle is likely to indicate that the car needs a servicing. These typically are the easier signs of a potential problem. On the other hand, predicting that a signal light bulb is about to fuse, for example, may be harder to gauge. A vehicle owner can take his or her vehicle to a specialist to examine the vehicle for potential problems, but this can be time consuming and expensive.

Various alternatives have been suggested in the art for identifying and diagnosing vehicle service conditions. For example, US Publication No. 2008/0215665 issued to Appleby, et al., discloses a method for generating an update status alert at a receiving device. The receiving device operates in a network of participating devices. Each participating device broadcasts status information about a monitored entity associated with a respective participating device which may be a vehicle. Accordingly, the method comprises receiving broadcast status information from each of the participating devices. The method further comprises aggregating the received status information to derive a consensus of the status information received from each of the participating devices; comparing the derived consensus with the status of the monitored entity of the receiving device; detecting a difference between the derived consensus and the status of the monitored entity; and in dependence of a difference being determined, generating an update status alert at the receiving device.

U.S. Pat. No. 6,738,697 issued to Breed discloses a telematics system for vehicle diagnostics. A vehicle diagnostic system which diagnoses the state of the vehicle or the state of a component of the vehicle and generates an output indicative or representative thereof is presented. A communications device transmits the output of the diagnostic system to a remote location, possibly via a satellite or the Internet. The diagnostic system can include sensors mounted on the vehicle, each providing a measurement related to a state of the sensor or a measurement related to a state of the mounting location, and a processor coupled to the sensors and arranged to receive data from the sensors and process the data to generate the output indicative or representative of the state of the vehicle or its component. The processor may embody a pattern recognition algorithm trained to generate the output from the data received from the sensors and be arranged to control parts of the vehicle based on the output.

Furthermore, certain vehicles are equipped with telematics systems that can diagnose the condition of a vehicle. One example is the SYNC system manufactured by the Ford Motor Company.

Nevertheless, while these alternatives provide certain benefits, what is needed is a method and system for monitoring the condition of vehicle components from a remote nomadic wireless device or computer. Moreover, having ready access to information about a vehicle component including, but not limited to, a location to purchase the vehicle component and its price, would also be desirable.

SUMMARY

One aspect may include a computer-implemented method for detecting a working condition of one or more vehicle components. The method includes communicating with a cellular communication device in a vehicle over a telecommunications network. The method further includes receiving over the telecommunication network a vehicle component characteristic or identifier for one or more vehicle components and one or more operation status identifiers for the one or more vehicle components based on data from the vehicle. The vehicle component identifier may include a vehicle component type, a vehicle component product number, a vehicle component product name, or other identification information. The one or more vehicle components may be one or more vehicle bulbs, one or more vehicle tires, or other vehicle components.

Another aspect may include determining a location for servicing or purchasing the one or more vehicle components based on the vehicle component characteristic or identifier. The location includes at least one of a retail store, dealership, or service location and, in one embodiment, a name, address, and one or more directions to the location.

In one embodiment, determining a servicing or purchasing location is based on a location of the vehicle. Accordingly, the method further includes receiving over the telecommunications network one or more geographic coordinates of the vehicle and determining the location for service or purchase of the one or more vehicle components based on the one or more geographic coordinates.

The method may further include determining a service status of the one or more vehicle components based on the one or more operation status identifiers. Based on the service status, the method may further include generating a message including an identification of the one or more vehicle components and a service or purchase location for the one or more vehicle components. Additionally, the method may include transmitting the at least one message for display at a terminal such as a computer, cellular telephone, or PDA.

In one embodiment, the method further includes receiving one or more locations predefined by a user and determining the service or purchase location with respect to the one or more predefined locations.

In one embodiment, there may be two sets of operation status identifiers. The first operation status identifiers are useful for display to a user at a nomadic device (ND) or a personal computer (PC). The second operation status identifiers may be readable and/or useful to a vehicle system. Accordingly, the method may further include corresponding the one or more second operation status identifiers to the one or more first operation status identifiers and determining the service status.

In one embodiment, the method further includes receiving from an inventory or servicing database price information for a service or purchase of one or more vehicle components and generating a message including a price for the service or purchase of the one or more vehicle components based on the price information.

In yet another embodiment, the method further includes receiving servicing or inventory information from the one or more service or purchase locations. The method further includes determining a service or inventory availability for the one or more vehicle components. The method additionally includes transmitting the service or inventory availability with the at least one message.

The method may further include, if the service or inventory of one or more vehicle components is unavailable in one service or purchase location, determining an alternate service or purchase location. Accordingly, the message includes the alternate service or purchase location.

Another aspect may include a computer program product for detecting a working condition of one or more vehicle components. The computer program product includes instructions for receiving a vehicle component characteristic or identifier for one or more vehicle components transmitted over a telecommunications network. The computer program product further includes instructions for receiving the one or more operation status identifiers for the one or more vehicle components based on data from the vehicle. The computer program product further includes instructions for determining a location for servicing or purchasing the one or more vehicle components based on the vehicle component characteristic or identifier.

The computer program product further includes instructions for determining a service status of the one or more vehicle components based on the one or more operation status identifiers. The computer program product further includes instructions for generating a message including an identification of one or more vehicle components and a service or purchase location for the one or more vehicle components based on the service status. Additionally, the computer program product includes instructions for transmitting the at least one message for display at a terminal. The terminal may be a nomadic device or a personal computer.

In one embodiment, the instructions for determining a location for servicing or purchasing the one or more vehicle components further include instructions for receiving one or more geographic coordinates of the vehicle transmitted over the telecommunications network. The computer program product may further include instructions for determining the location for service or purchase of the one or more vehicle components based on the one or more geographic coordinates.

In additional embodiments, the computer program product may include instructions for transmitting one or more manual inspection input signals originating from the at least one terminal for performing a manual inspection of the one or more vehicle components at the vehicle. The computer program product may further include instructions for receiving the one or more operation status identifiers based on the manual inspection.

In further embodiments, the computer program product includes instructions for transmitting an input signal originating from the at least one terminal for an automatic inspection of the one or more vehicle components based on an automatic inspection sequence performed at the vehicle. The computer program product may further include instructions for receiving the one or more operation status identifiers based on the automatic inspection. The automatic inspection sequence may include an inspection of one or more vehicle lights, a battery condition, vehicle diagnostics, oil condition, oil change status, and maintenance record retrieval.

Another aspect may include a computer-implemented system for detecting a working condition of one or more vehicle components. The computer-implemented system may include a data processor configured to receive from a vehicle a vehicle component characteristic or identifier for one or more vehicle components.

The data processor may be further configured to receive one or more operation status identifiers for the one or more vehicle components based on data received from the vehicle. Furthermore, the data processor may be configured to determine a location for servicing or purchasing the one or more vehicle components based on the vehicle component characteristic or identifier.

The data processor may also be configured to determine a service status of the one or more vehicle components based on the one or more operation status identifiers. The data processor may be further configured to generate a message including an identification of the one or more vehicle components and a service or purchase location for the one or more vehicle components based on the service status. The data processor may be additionally configured to transmit the at least one message for display at a terminal such as a computer, cellular telephone, or PDA.

In one embodiment, the vehicle includes a trailer connected to the vehicle and the one or more vehicle components may include a trailer connection. Accordingly, the data processor may be further configured to detect the working condition of the vehicle and the trailer.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
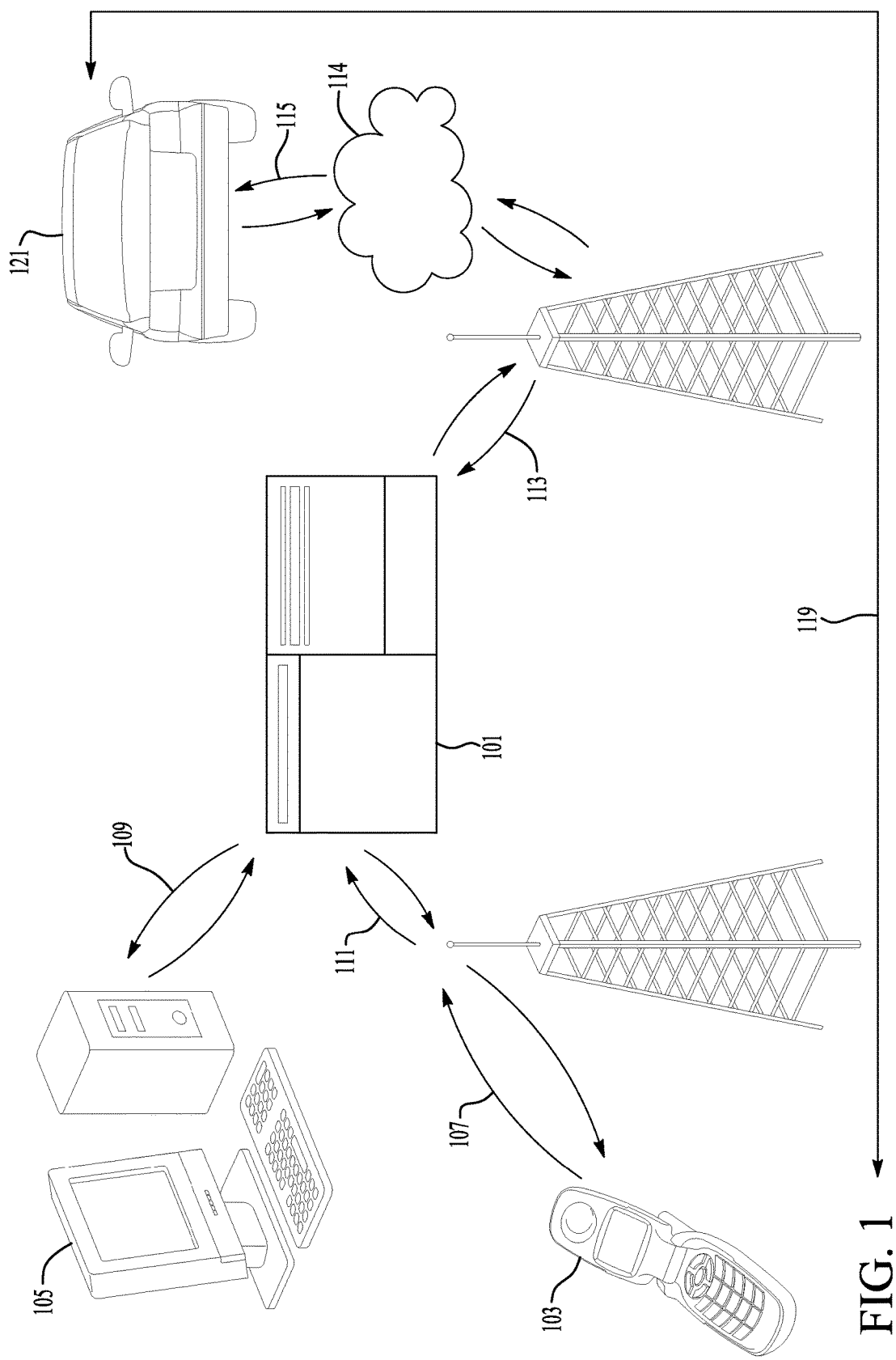
FIG. 1 shows an illustrative example of a communication system through which a nomadic device can communicate with a vehicle according to one or more of the various embodiments.

FIG. 1 shows an illustrative example of a communication system in accordance with an embodiment of the present invention. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized computing system 101. A system similar to the system shown in FIG. 1 is available from CRAYON INTERFACE, INC.

In this illustrative embodiment, the centralized computing system is one or more server systems which may include processing capability for incoming nomadic device signals designated to interact with a remote vehicle 121.

For example, the server(s) 101 may include an automated call server and/or web host. Further, the server(s) may route an incoming signal from a nomadic device 103 to the appropriate remote vehicle. Data sent in this fashion may be sent using data-over-voice, a data-plan, or in any other suitable format.

Data can also be exchanged with the remote vehicle through the server(s) using a personal computer 105. In this case, the data is likely, although not necessarily, sent over the internet 109.

Once the server(s) 101 receive the incoming data request from the remote source 103, 105, the message may be processed and/or relayed to a vehicle. The vehicle may be identified by a header associated with one or more incoming data packets, or may be identifiable based on a database lookup, for example.

Figure 2A:
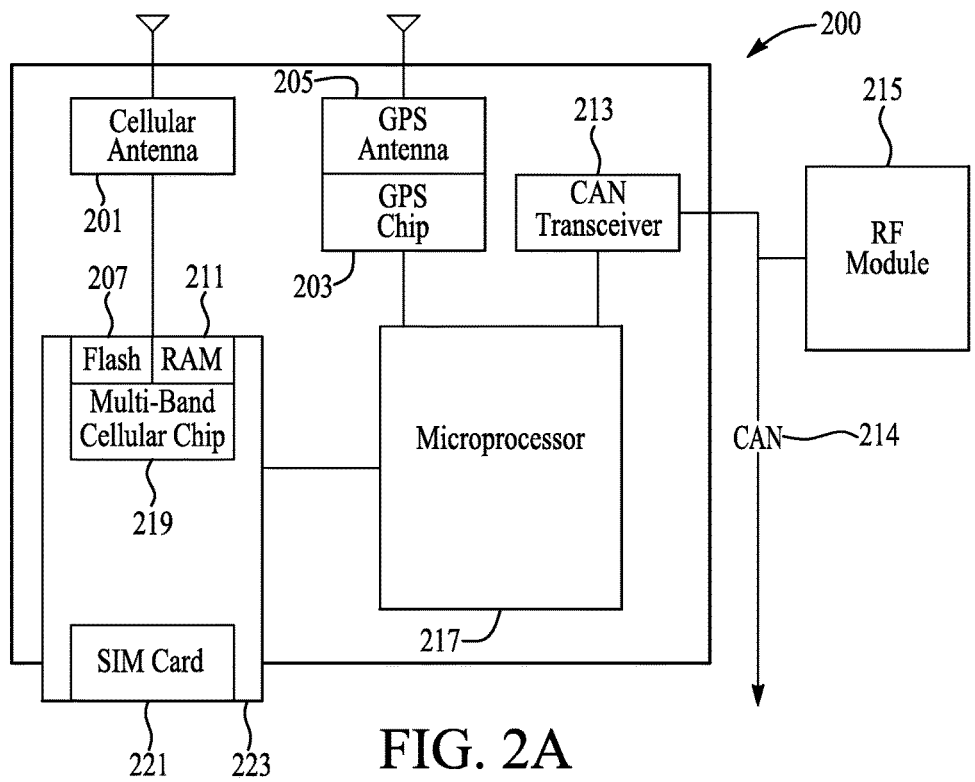
FIGS. 2a-d show illustrative examples of vehicle-based communication devices that provide communication to a remote network according to one or more of the various embodiments.

The relay to the vehicle may be sent out from the server(s) 101 through a network (e.g., without limitation, a cellular network 113, the internet, etc.) and passed through a cellular network 115 to the vehicle 121. In one embodiment, the relay may additionally be passed through a broadband network 114 (e.g., 802.11g or WiMax). With reference to FIG. 2a, a remote communication device 200 in the vehicle receives the signal sent from the servers and processes it or relays it to an appropriate processing system within the vehicle.

In at least one illustrative embodiment, the vehicle may also be outfitted with a communication transceiver, such as, but not limited to, a BLUETOOTH transceiver. This transceiver may allow communication with the nomadic device (ND) 103 using a direct signal 119 if, for example, cellular networks are unavailable.

FIGS. 2a-d show illustrative examples of vehicle-based communication devices that provide communication to a remote network.

FIG. 2a shows an illustrative example of a communication device in communication with a GPS module.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, which may include flash memory 207 and RAM 211, is installed in the module as part of a removable device 223 including a SIM card 221. The SIM card may contain user identifying information that allows access to the cellular network under a particular user's plan.

Additionally, the module may include a GPS chip 203 that can process and decode a signal from the GPS antenna 205 and send this information to a microprocessor 217.

The microprocessor 217 may also be in communication with a vehicle data bus that provides access to various vehicle modules, such as a RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
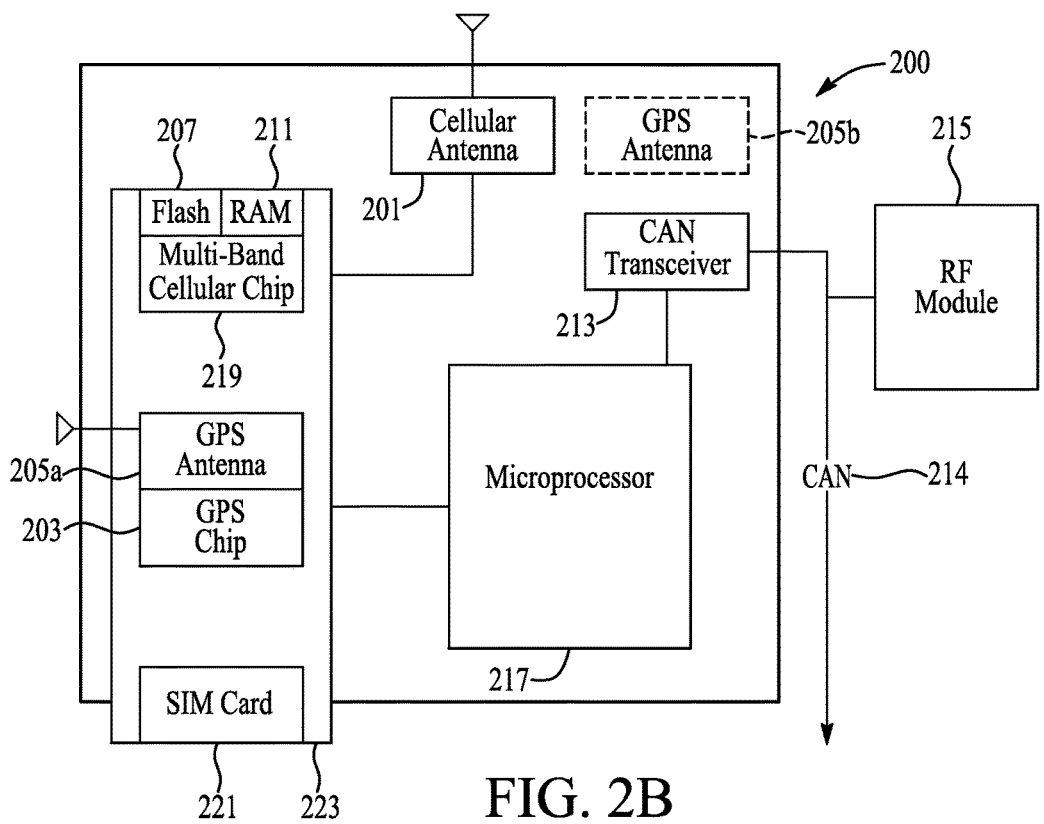

FIG. 2b shows a second exemplary embodiment in which a cellular module and GPS are on the same board 223. In this illustrative embodiment, the removable board (this board may also be permanently attached to the device) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna and/or the GPS Antenna 205b, the signal may be sent to the corresponding cellular/GPS chip for processing, and then passed to the microprocessor 217. The microprocessor interfaces with the CAN transceiver 213 to connect to a vehicle network 214 and vehicle modules such as a RF module 215.

Figure 2C:
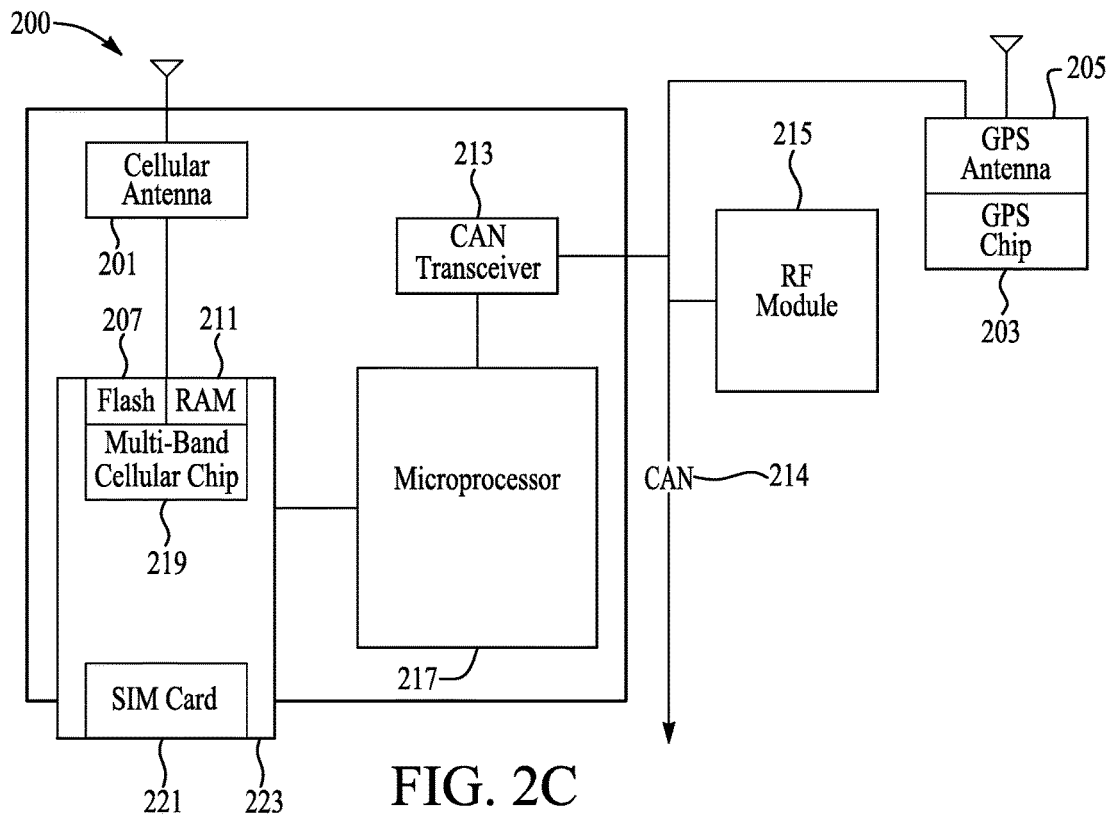

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
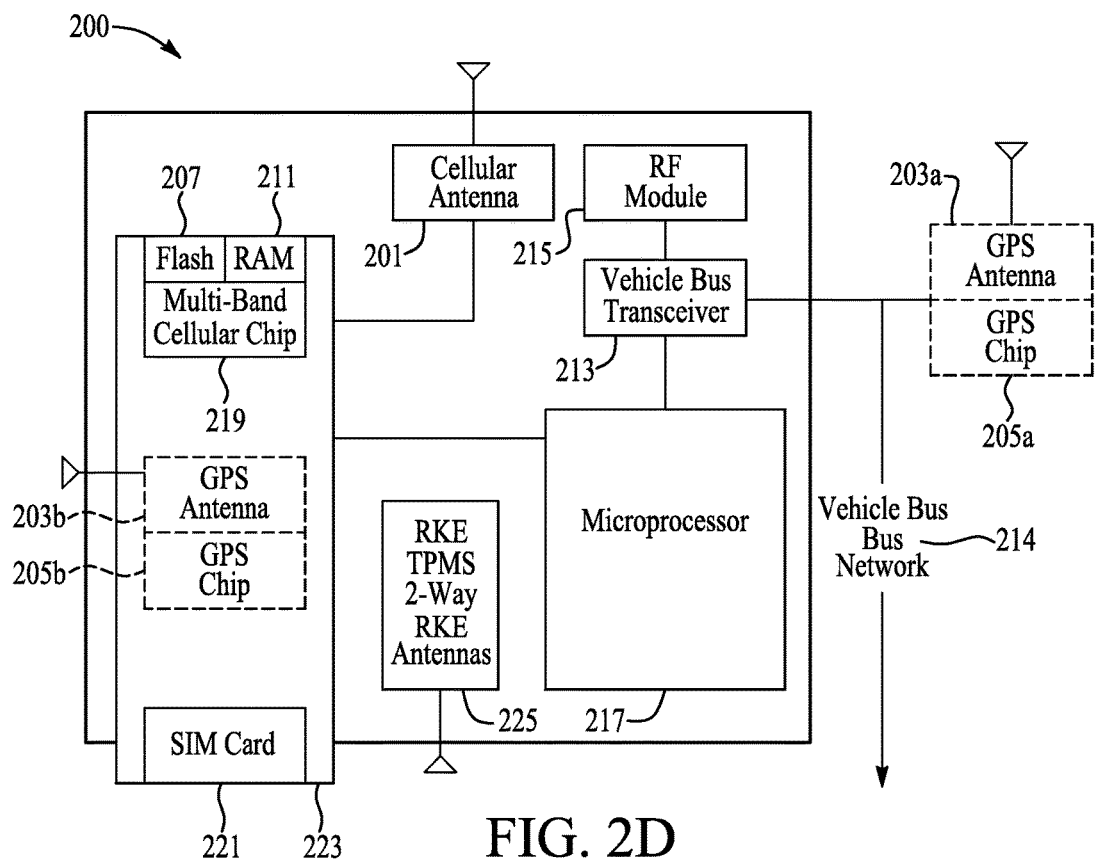

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular chip 219, including flash memory 207 and RAM 211. The signal may be processed and sent to the microprocessor 217. The multi-band cellular chip 219 may be located on a removable circuit board 223, which may also include a SIM card 221.

Figure 3:
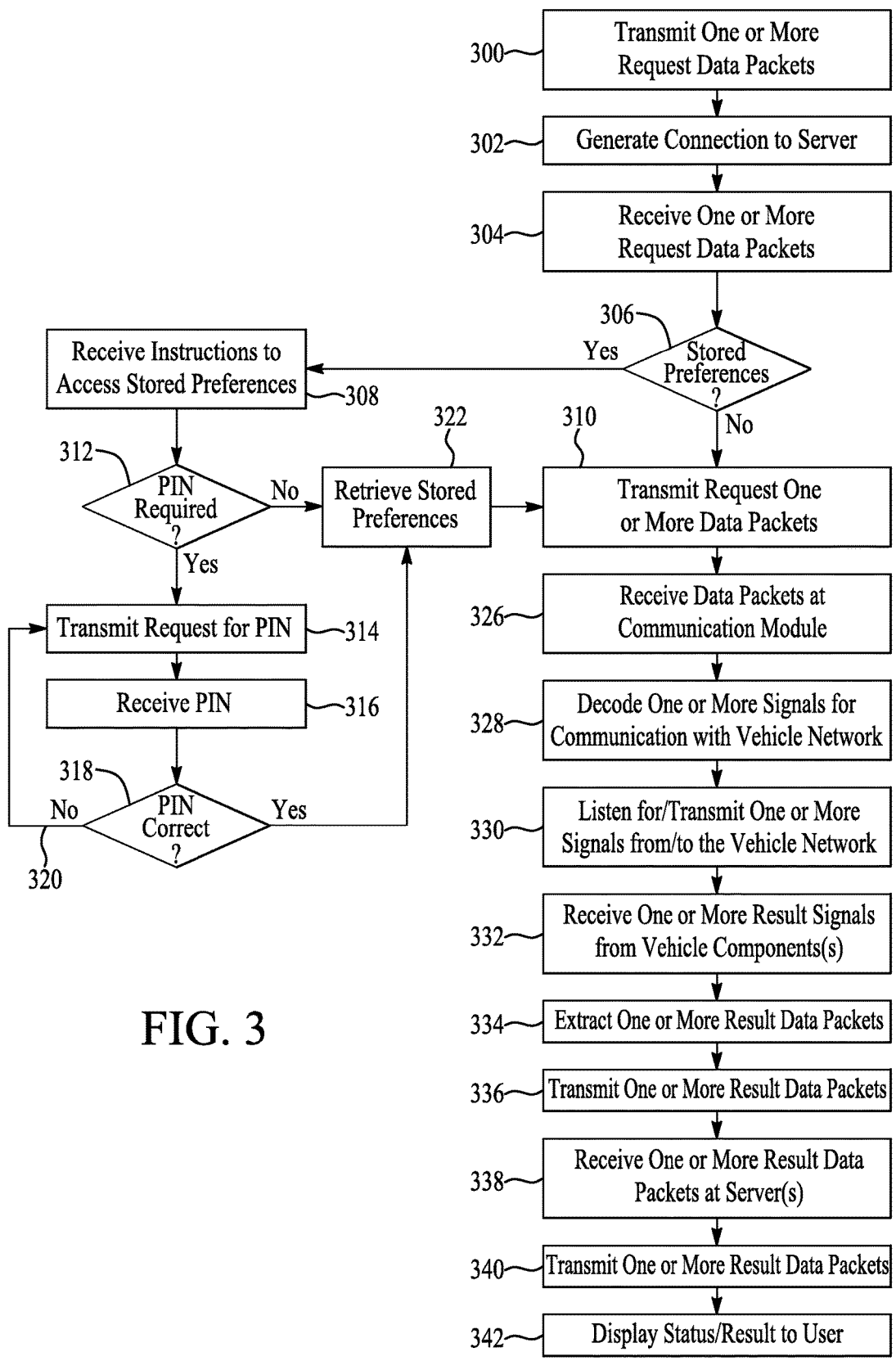
FIG. 3 illustrates a non-limiting exemplary operation of the vehicle-based communication device according to one or more of the various embodiments.

FIG. 3 illustrates the operation of the communication module 200 according to one of the various embodiments. The ND 103 or computer 105 may be used as a device to monitor the condition of various features of the vehicle. The ND 103 or computer 105 may include software for facilitating the monitoring of the one or more vehicle conditions. The software may be downloaded to the ND 103 or computer 105 from a website (such as an OEM's website) or, as another non-limiting example, come factory installed in the ND 103. One example of a website is SyncMyRide.com hosted by The Ford Motor Company. In one embodiment, the software may be a programmed in the JAVA language (manufactured and distributed by Sun Microsystems).

In one or more embodiments, a user may control one vehicle with multiple NDs 103 or computers 105. Additionally or alternatively, the user may use one ND 103 or computer 105 to operate components of multiple vehicles.

The user may activate and operate the application to monitor one or more vehicle components or systems (hereinafter referred to as a "vehicle monitoring application") using one or more button or key presses from his or her ND 103 and/or computer 105. In one embodiment, the ND 103 and/or computer 105 may be equipped with a shortkey or "hot button" from which the vehicle monitoring application may be activated. Alternatively or additionally, the user may activate and operate the vehicle monitoring application through a menu selection from a graphical user interface (GUI) displayed on the ND 103 and/or computer 105. Alternatively or additionally, the user may operate and activate the vehicle monitoring application through one or more voice-activated commands received by the ND 103 and/or computer 105. The ND 103 and/or computer 105 may include speech recognition software for interpreting and processing commands from a user into machine readable language. In one embodiment, the speech recognition software may be programmed and/or stored to the web server. Non-limiting examples of a user may be a vehicle owner, a vehicle passenger, a vehicle service technician, or a vehicle dealer.

Upon making the request (via, e.g., key button press or voice), one or more data packets may be transmitted from the ND 103 or computer 105 as illustrated in block 300. Non-limiting examples of data transmitted in the data packets may include a mobile identification number (MIN), a customer identification number, the one or more commands triggered from the ND 103 and/or 105, and the vehicle identification number (VIN).

For example, if a user desires to check the condition of his or her interior lights from his or her computer 105, the user may begin operation of the vehicle monitoring application by selecting a selectable button on the user display of the computer 105 or speaking a command into the computer's microphone (not shown) to activate the vehicle monitoring application. In some embodiments, upon initiating activation of the vehicle monitoring application, the user may be presented with one or more further selections for operating the vehicle monitoring application. Selection of one or more selectable button from the user interface may trigger the transmission of the one or more data packets.

The one or more data packets transmitted from the ND 103 and/or computer 105 may include instructions for accomplishing the selection/request made by the user at the vehicle. For example, in the above example, where the user desires to monitor the condition of his or her interior lights, one or more data items may be transmitted from the computer 105 based on the user's selection.

The user may monitor the condition of other non-limiting vehicle components. For example, the user may select a selectable input (e.g., a button or hyperlink) for monitoring the condition of the exterior lights and/or light signals. As another example, the user may select a selectable input for assessing the condition of the battery. As another example, there may be a selectable input for running one or more vehicle diagnostic tests to check for diagnostic trouble codes (DTCs). Furthermore, there may be a selectable input for assessing the condition of the vehicle's oil and reporting on the status of the vehicle's oil change history (e.g., the vehicle's last oil change). A user may further select a selectable input for receiving a report on the vehicle's maintenance records (e.g., with respect to the vehicle's mileage).

In one embodiment, the data packets may include instructions for automatically inspecting one or more vehicle components. The automatic inspection may be accomplished according to an automatic inspection sequence (e.g., stored at the vehicle or at the server(s) 101). In another embodiment, the user may manually monitor the condition of vehicle components from his or her ND 103 and/or computer 105. In some embodiments, the user may further command a trailer brake and/or trailer signal lights. Further details of the automatic and manual inspection will be described below with respect of FIG. 5.

In an additional embodiment, the user may also be able to monitor the status of his or her vehicle tires. For example, a user may request from his or her ND 103 and/or computer 105 for the status of one or more tires. As will be described below and with respect to FIG. 3, data packets with these and other instructions may be transmitted to the vehicle, processed, and one or more result data packets may be returned to the ND 103 and/or computer 105 with the status of at least one tire. The report generated to the user may provide information on the pressure in each requested tire. In one embodiment, the display may identify the tire by highlighting the tire on the ND 103 and/or computer 105 display.

The report may also include information about purchasing a new tire (e.g., location and price). Further details of the report will be described in detail below.

Referring back to FIG. 3, before or after the data packets are transmitted, a connection may be generated with the server(s) 101 as illustrated in block 302. The server(s) 101 may or may not be a web server. Once a connection to sever(s) 101 is made, the data packets may be received by the server(s) 101 as illustrated in block 304. Alternatively or additionally, a direct connection may be made between the ND 103 or computer 105 and the cellular communication module 200 (i.e., without making a connection to server(s) 101). Accordingly, the operation of one or more embodiments may be accomplished without a server.

The server(s) 101 may process one or more received commands for transmission to the vehicle 121. Processing the data packet may include, but is not limited to, authenticating the one or more commands, authenticating the user (e.g., determining if the user is a registered user) and authenticating the cellular/mobile phone (e.g., matching the MIN to the VIN) transmitted in the data packet. In one non-limiting embodiment, the server(s) 101 may process the data packet using one or more look-up tables and validating the information in the data packets against the one or more tables. The server(s) 101 may also house software for accomplishing one or more embodiments further described below.

The server(s) 101 may be in communication with one or more databases (not shown). Non-limiting examples of data that may be stored in the one or more databases may include locations from where to buy replacement parts, locations of servicing dealerships, information relating to the replacement part (e.g., which part to purchase by part number, DTCs, inventory data (e.g., from retailers and dealerships) and vehicle maintenance records. The data may be retrieved from third-party systems, OEM (e.g., vehicle) databases/servers or manually inputted by a user (e.g., an OEM).

In one embodiment, a determination may be made at the server(s) 101 if the user has any personal preferences associated with the vehicle monitoring application as illustrated in block 306. While the preferences may be stored elsewhere, for purposes of illustration, FIG. 3 illustrates the operation based on the personal preferences being stored on the server(s) 101.

The personal preferences may be stored on the server(s) 101. Alternatively or additionally, the personal preferences may be stored in the ND's 103 or computer's 105 memory (not shown). In yet another embodiment, the personal preferences may be stored at the vehicle (e.g., on the SIM card 221, on the microprocessor 217 of the cellular communication module 200, or in a memory module present elsewhere in the vehicle). In this latter embodiment, the server(s) 101 may route the data packets to the vehicle without further processing.

Non-limiting examples of personal preferences may be the inspection sequence for inspecting the vehicle lights, one or more preferred locations for acquiring a replacement vehicle component, and/or one or more preferred locations for servicing the vehicle. The preference may be stored in the server(s) 101, although it may also be stored on the ND 103 and/or computer 105 or at the vehicle.

The inspection sequence may additionally be pre-programmed to the vehicle by, for example, an OEM. As such, in order to activate an automatic inspection, the user may select whether to perform an automatic inspection or a manual inspection from the ND 103 and/or computer 105.

Referring back to FIG. 3, if the user has personal preferences associated with one or more vehicle components, the server(s) 101 may receive instructions to access the stored preferences as illustrated in block 308. In one embodiment, the instructions may be transmitted with the one or more data packets received from the ND 103 and/or computer 105. The server(s) 101 may extract or read these instructions from the data packets to retrieve the stored personal preferences.

In one embodiment, a further determination may be made at server(s) 101 as to whether a personal identification number (PIN) is required to access the personal preferences or to operate the vehicle monitoring application as illustrated in block 312. The PIN may be stored at server(s) 101 or may be transmitted with the data packets transmitted from the ND 103 and/or the computer 105. If a PIN is required, the server(s) 101 may transmit a request for the PIN as illustrated in block 314. The request may be transmitted to one or more memory locations (e.g., a database) on the server(s) 101 or to the remote terminals 103, 105. The PIN may be retrieved from the server(s) 101 using, for example, a look-up table based on information such as VIN, a customer number, a MIN, or other non-limiting identifiers. It should be understood that the PIN may be retrieved in any other means known in the art and the previous example is illustrative.

The server(s) 101 may receive the PIN as illustrated in block 316. The PIN may then be validated as illustrated in block 318. If the PIN is not correct, the server(s) 101 may re-transmit the request as represented by loop 320. In one embodiment, a user may reenter a PIN a predetermined number of times (e.g., 3 or 5 times) after entering an incorrect PIN. If the PIN is correct, the server(s) 101 may retrieve the personal preferences associated with the request, as illustrated in block 322, and transmit the one or more data packets with the stored preferences to the cellular communication module as illustrated in block 310.

If a PIN is not required to access the personal preferences or if there are no stored preferences, upon receiving the one or more data packets, the server(s) 101 may transmit the one or more data packets to the cellular communication module as represented in block 310. The one or more data packets may be transmitted over the network (e.g., cellular network 113 or the internet). The cellular communication module 200 may then receive (e.g., via cellular antenna 201) the one or more data packets over the network as represented in block 326.

The microprocessor 217 may listen for and/or transmit signals from/to the vehicle network 214 as represented in block 330. In one embodiment, the one or more signals may be decoded and translated at the microprocessor 217 for communication with the vehicle data bus (e.g., CAN transceiver 213 and vehicle network 214) as represented in block 328.

As will be described below, the user may receive a status message at ND 103 and/or computer 105 regarding the working condition of the vehicle component(s). The status message may be received as a text message, SMS message, or email.

The status message may include additional information. Non-limiting examples may include one or more locations where to purchase or service parts requiring replacement or servicing, the name and address of the one or more locations, the price of the service or replacement part, directions to the one or more locations, and the distance of the one or more locations from a predetermined location.

Figure 4:
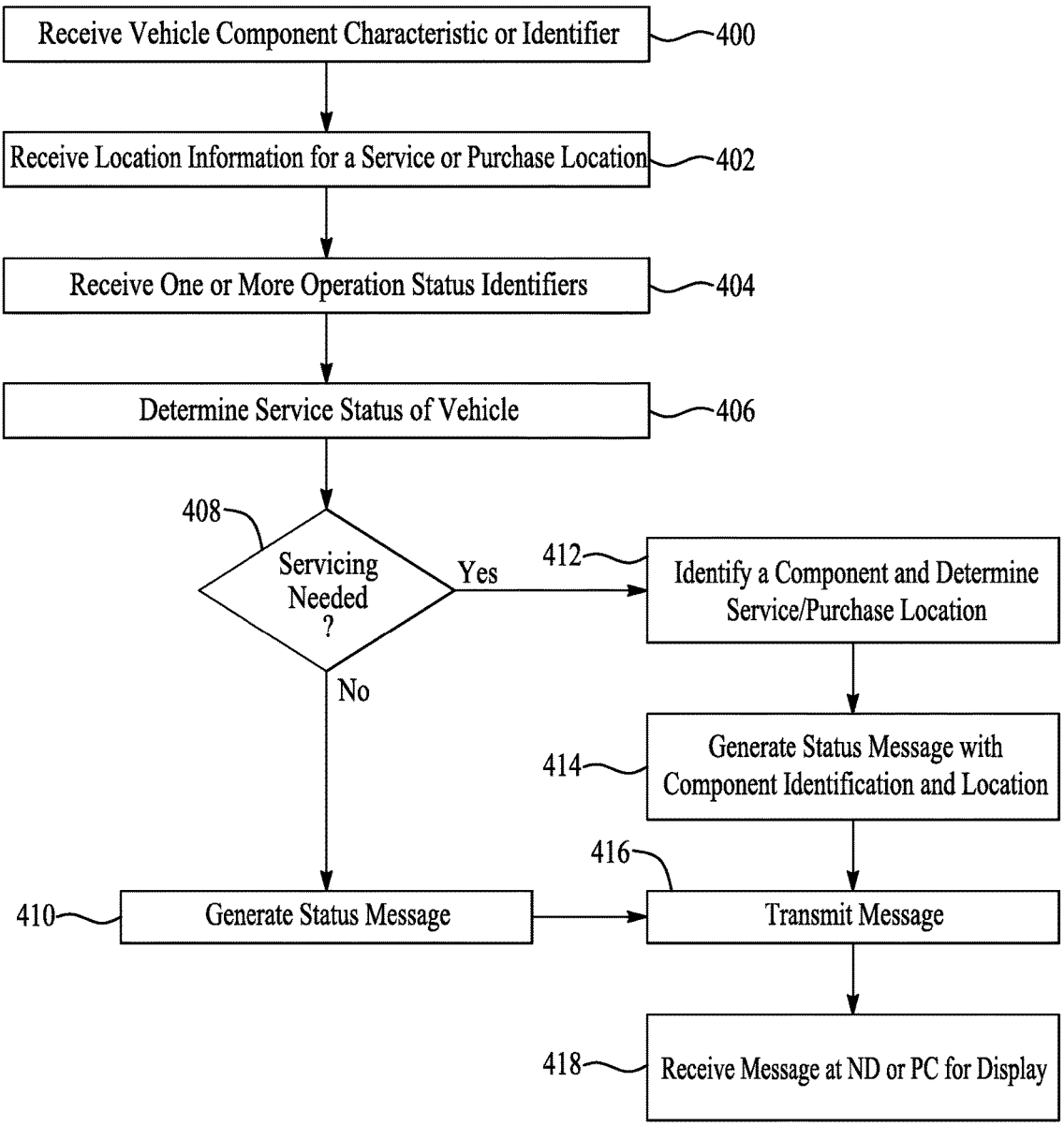
FIG. 4 illustrates the operation of one aspect of the system according to one or more of the various embodiments.

FIG. 4 illustrates this aspect according to one or more embodiments. One or more vehicle components characteristics or identifiers may be received by the server(s) 101 as illustrated in block 400. The characteristics or identifiers may also be received by the ND 103 and or computer 105. For purposes of illustration, the operation is described with respect to the server(s) 101.

The characteristics or identifiers may be programmed to and stored in memory (not shown) of server(s) 101. Alternatively or additionally, the characteristics or identifiers may be stored on software in communication with server(s) 101.

A servicing location or location for purchasing one or more vehicle components may be received as illustrated in block 402. The locations may also be programmed to at least one of server(s) 101, ND 103, and/or computer 105. In one embodiment, the location may be user defined. For example, at least one user preference may be to find a service or purchase location near the user's home, office, or other location defined by the user. In another embodiment, the location may be based on the geographic location of the vehicle. In this embodiment, location information of the vehicle (e.g. the vehicle's geographic coordinates) may be received by and transmitted from the GPS module (GPS antenna 205 and GPS chip 203) to the server(s) 101. Server(s) 101 may communicate with a mapping engine (not shown) for determining location information. For example, the mapping engine may determine an address of the service or purchasing location based on the geographic coordinates. As another non-limiting example, the mapping engine may determine the distance of a servicing or purchasing location with respect to the user defined location.

One or more identifiers representing an operation status of the vehicle components may also be received as illustrated in block 404. The identifiers may be used in processing (i.e., translating) the identifiers received from the vehicle into computer-readable information. For example, the codes may translate vehicle-based diagnostic trouble codes into computer readable codes. In one embodiment, the processing may occur using a look-up table. In another embodiment, the codes may be processed using instructions programmed to the server(s) 101. The one or more remote terminal-based identifiers may be programmed to the server(s) 101.

Upon receiving one or more status identifiers from the vehicle, an operation status may be determined as illustrated in block 406.

Based on the operation status received from the vehicle, a determination may be made whether a servicing is needed or one or more parts require replacement as illustrated in block 408. If no servicing or replacement parts are needed, a message may be generated for transmission to the ND 103 and/or computer 105 indicating the status of the vehicle component(s) as illustrated in block 410.

If servicing or replacement parts are needed, the needed part and at least one service or purchase location is identified as illustrated in block 412. The needed part may be identified by, without limitation, part name, part type, or part number. The part and location may be identified through a look-up of a database (not shown) in communication with server(s) 101.

A message may be generated with the location information and an identification of the part as illustrated in block 414. Additional non-limiting examples of information that may be included in the message include a price for servicing or purchasing one or more vehicle components and servicing and inventory status of the vehicle components. In one embodiment, the message may further include one or more alternate locations if servicing or purchase is unavailable at one or more locations based on inventory information or service schedules. Inventory information or service schedules may be stored and transmitted from one or more databases (not shown) external to system and in communication with server(s) 101, for example, and without limitation, retailer databases or vehicle dealership databases. The message may be transmitted to remote terminals 103, 105 as illustrated in block 416 and received by remote terminals 103, 105 as illustrated in block 418.

Figure 5:
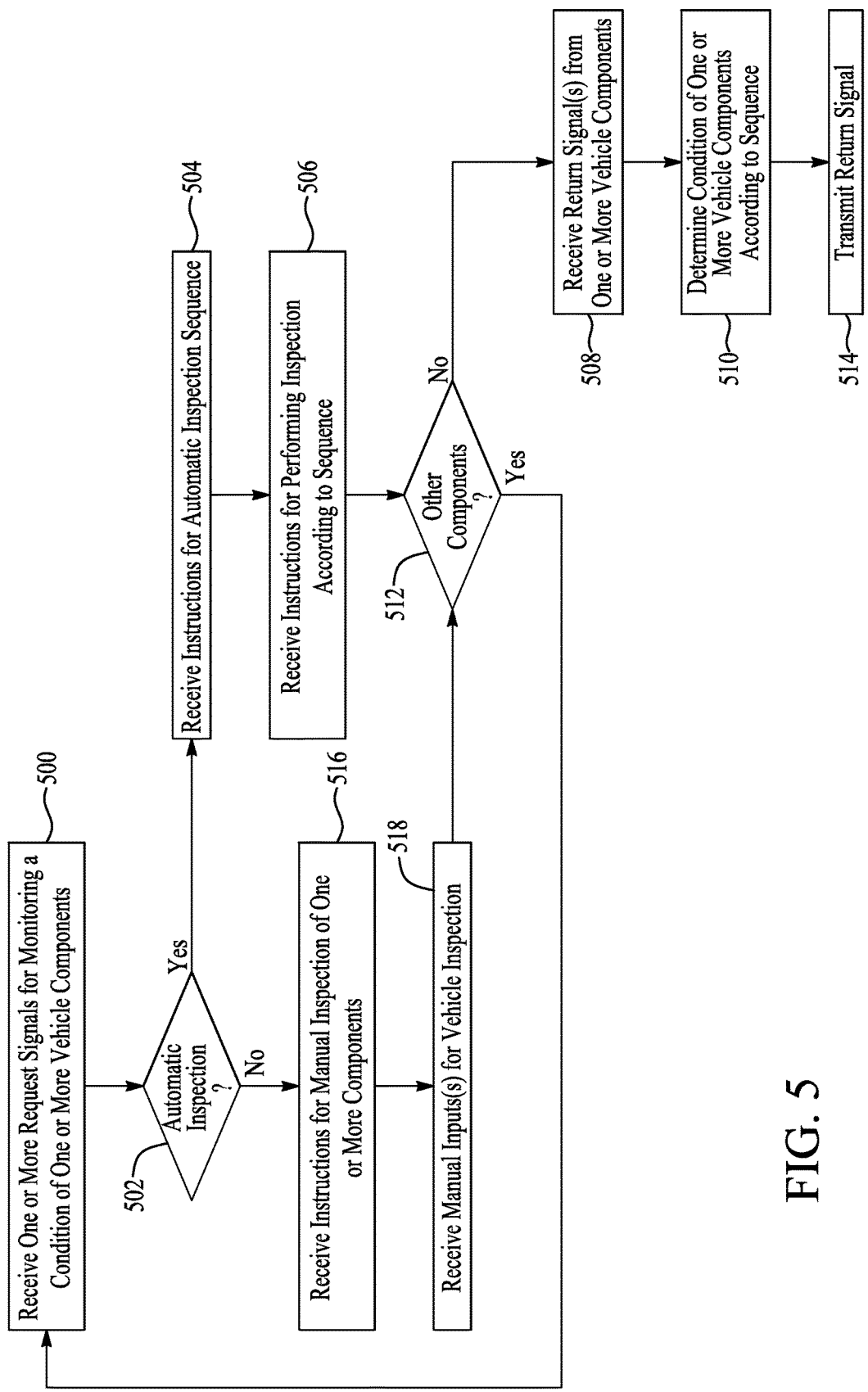
FIG. 5 illustrates the operation of another aspect of the system according to another one of the one or more various embodiments.

An automatic inspection of the vehicle may be accomplished using one or more embodiments. FIG. 5 illustrates this aspect. As illustrated in block 500, the cellular communication module 200 may receive one or more signals for monitoring the condition of one or more vehicle components. The signals may be decoded for interpretation by the vehicle by the microprocessor 217. The signals may includes one or more operation status identifiers (e.g., data bus codes) which may or may not be proprietary.

For example, the user may desire to determine the condition of the exterior lights of his or her vehicle. From the ND 103 and/or computer 105, upon selecting one or more inputs for conducting an inspection of the vehicle lights, the data packets may be received by the communication module 200 which may communicate with the CAN transceiver 213 to receive data from the vehicle lighting system via the vehicle network 214.

A determination may be made whether the user has requested an automatic inspection as illustrated in block 502. The request for an automatic inspection may be transmitted as a data packet from the ND 103 and/or computer 105 or the microprocessor 217 may be programmed to output instruction for an automatic inspection as a default. Upon receiving instructions for a sequence associated with the automatic inspection, as illustrated in block 504, the microprocessor 217 may further receive instructions for performing the automatic inspection according to the inspection sequence as illustrated in block 506. One or more result signals may be received by the microprocessor 217 (via the vehicle network 214) from the one or more vehicle components as illustrated in block 508. The vehicle condition of the one or more components may then be determined according to the instructions as illustrated in block 510.

In one embodiment, a further determination may be made if there are other components to inspect as illustrated in block 512. For example, upon inspecting the exterior lights based on the request, the user may be asked whether he or she would like to have other components inspected. Non-limiting examples may include checking on the battery condition, performing a diagnostic test, checking for diagnostic trouble codes (DTC), checking the oil and when the last oil changed may have occurred, and viewing and transmitting maintenance records. At times, the condition of all components may be automatically monitored in the automatic inspection sequence. Accordingly, in some embodiments, the decision in block 512 may not occur automatically.

As illustrated in block 514, if no further components need to be inspected, the return signal(s) received from the one or more vehicle components may be transmitted from the cellular communication module 200 to the ND 103 and/or computer 105. The result signal may include a status of the condition of the vehicle component for display to the user. The result signal may further include instructions for displaying the result to the user as at least one of an email, SMS or text message.

In one embodiment, the user may manually inspect his or her vehicle. The cellular communication module 200 may receive instructions for a manual inspection as illustrated in block 516. Manual inputs from the user may be received as one or more data packets as illustrated in block 518. Each manual input data packet may be received by the communication module 200 which may communicate with the CAN transceiver 213 for receiving one or more result signals from the one or more vehicle components as illustrated in block 508. Accordingly, the condition of the one or more vehicle components may be determined as illustrated in block 510. In one embodiment, a determination may be made whether there are other components to be inspected as illustrated in block 512.

A result signal may be transmitted from the one or more components that have been inspected as illustrated in block 514.

Referring back to FIG. 3, the cellular communication module 200 may receive the one or more result signals transmitted from the one or more vehicle components as illustrated in block 332 via the vehicle bus. The communication module 200 may extract one or more return data packets from the return signal for transmission to the ND 103 and/or computer 105 as in block 334. Transmission may be accomplished by the cellular antenna 201 over network 115. Furthermore, the cellular communication module 200 (e.g., the microprocessor 217) may process the return data packets for interpretation by the server(s) 101 and/or the remote terminal 103, 105. This processing may occur, for example, using a look-up table.

The data packets may be transmitted to the remote terminals 103 and/or 105 as illustrated in block 336. In one embodiment, the return data packets may be routed through server(s) 101, as illustrated in block 338, which may or may not further process the data packets for transmission to the remote terminals 103 and/or 105.

If the server(s) 101 process the result signal(s), the server(s) 101 may be programmed to extract from a database (not shown) in communication with server(s) 101 information about the vehicle component(s) (e.g., and without limitation, for a fused bulb, the bulb type). The server(s) 101 may further retrieve information about where to purchase the one or more components (including, but not limited to, a retail store, a dealership, or a service shop). Other non-limiting information may be retrieved for inclusion in the result signal such as a name and address of a business where a vehicle part can be acquired, prices of the one or more vehicle component(s), the distance of a business from the vehicle location, the amount of inventory at a location for the one or more vehicle component(s), and directions to the business. As described above, this data may be stored in and extracted from a database (not shown) in communication with server(s) 101.

The result data packet(s) may be transmitted to (as illustrated in block 340) and received by the ND 103 and/or computer 105. A report may be generated and displayed to the user showing, for example, the condition status of the one or more vehicle components as illustrated in block 342. For example, in one embodiment, the report may show which bulb in the vehicle is out and the type of bulb needed to replace it. The report may further state (without limitation) where the user may purchase the bulb, the price of the bulb, how many items are in inventory, the bulb type, and the distance of a location from where to acquire the bulb. As described above, this information may be retrieved from server(s) 101.

As another example, if a user submitted a request to check the condition of one or both signal lights and if the data item was unsuccessfully transmitted to one or both signal lights, then a return data item may be transmitted from the cellular communication module 200 to the ND 103 and/or computer 105 indicating that transmission was unsuccessful. This message may be displayed on the user interface. Alternatively, if the data item was successfully transmitted, a message displaying a successful transmission may be returned. In some embodiments, the user may further see such non-limiting messages as "left signal light working" or "right signal light working."

The report may be generated each time the user requests the status of one or more vehicle components. Alternatively or additionally, the report may be generated at predetermined time intervals or according to a user preference (e.g., on a monthly basis or each time the user specifically requests a report). The report may include general details regarding the status of the one or more vehicle components and/or very specific details. For example, general details may include, but are not limited to, which components may or may not be functional. Specific details may include, but are not limited to, information regarding the replacement part needed (e.g., a part number).

In one embodiment, the report may further include information relating to dealers, retail stores, and/or service shops. Non-limiting examples may include in which location a replacement part may be purchased and the geographic location of the dealer, retail store and/or service shop. The report may further include inventory information, distance of a location from a predetermined location (e.g., the driver's home or office), and distance of a location from the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented method comprising:
   communicating from a cellular phone to a cellular communication device arranged in communication with a vehicle computing system (VCS);
   receiving a vehicle component identifier for a component from the VCS, including a component status;
   determining a location for servicing or purchasing the component; and
   based on the component status, generating and displaying on the cellular phone a message including a service or purchase location for the vehicle component.

2. The computer-implemented method of claim 1 further comprising:
   receiving a request from the cellular phone for obtaining an operation status of a specific vehicle component; and
   communicating the request to the VCS.

3. The computer-implemented method of claim 1 further comprising:
   receiving one or more geographic coordinates of the vehicle from the VCS; and
   determining the location for service or purchase of the vehicle component based on proximity to the geographic coordinates.

4. The computer-implemented method of claim 1 further comprising:
   receiving one or more locations predefined by a user; and
   determining the service or purchase location based on proximity to the one or more predefined locations.

5. The computer-implemented method of claim 1 wherein the vehicle component identifier includes at least one of a vehicle component type, a vehicle component product number, or a vehicle component product name.

6. The computer-implemented method of claim 1 wherein the location includes at least one of a retail store, dealership, or service location.

7. The computer-implemented method of claim 6 wherein the location further includes at least one of a name, address, and one or more directions to the location.

8. The computer-implemented method of claim 7 further comprising:
   receiving from an inventory or servicing database price information for a service or purchase of the component; and
   wherein the message further includes the price.

9. The computer-implemented method of claim 1 further comprising:
   receiving servicing or inventory information from the service or purchase location, wherein the message further includes availability of the service or the component for replacement, based on the received servicing or inventory information.

10. The computer-implemented method of claim 9 wherein the service or purchase location is a first service or purchase location and the method further comprises determining one or more second service or purchase locations if the service or inventory of the component is unavailable in the first service or purchase location, wherein the at least one message further includes the one or more second service or purchase locations.

11. The computer-implemented method of claim 1 wherein the one or more vehicle components is at least one of one or more vehicle bulbs or one or more vehicle tires.

* * * * *